United States Patent [19]

Aoyama et al.

[11] 4,049,874

[45] Sept. 20, 1977

[54] PROCESS FOR PRODUCING AN ARCHITECTURAL PRECAST CONCRETE PANEL

[75] Inventors: Tsuyoshi Aoyama, Hoya; Yoshimasa Hayashi, Tokyo; Michio Nagano, Urawa; Hiroshi Nagase, Tokyo, all of Japan

[73] Assignee: Fujikura Kasei Co., Ltd., Japan

[21] Appl. No.: 648,898

[22] Filed: Jan. 14, 1976

Related U.S. Application Data

[63] Continuation-in-part of Ser. No. 592,938, July 3, 1975, abandoned, which is a continuation of Ser. No. 455,504, March 27, 1974, abandoned.

[30] Foreign Application Priority Data

Aug. 1, 1973 Japan .................................. 48-86624

[51] Int. Cl.$^2$ .......................... B32B 13/12; B28B 1/16
[52] U.S. Cl. ....................................... 428/451; 52/612; 264/256; 264/DIG. 57; 428/454
[58] Field of Search .............. 264/135, 256, DIG. 57; 52/596, 612; 106/90; 260/29.65, 42.13; 428/446, 454, 538, 451

[56] References Cited

U.S. PATENT DOCUMENTS

| | | | |
|---|---|---|---|
| 3,097,080 | 7/1963 | Weir | 264/256 X |
| 3,439,076 | 4/1969 | Loois | 264/256 X |
| 3,806,571 | 4/1974 | Ronnmark | 260/29.65 |
| 3,822,229 | 7/1974 | McMaster | 52/596 |
| 3,865,683 | 2/1975 | Schnee | 428/451 X |
| 4,001,370 | 1/1977 | Baker | 264/256 |

*Primary Examiner*—Thomas P. Pavelko
*Attorney, Agent, or Firm*—McGlew and Tuttle

[57] ABSTRACT

The present invention relates to a process for producing a large architectural precast concrete panel for use in outside walls and applicable to the curtain wall technique of architecture, wherein a resinous substance and an inorganic material are placed in a mold, then a hydraulic cement composition is placed on the layer of above mixture. The polymerization of the resinous substance and the hydration of the cement composition are carried out in the mold simultaneously. A particularly preferred process employs the following critical conditions:

1. The viscous methyl methacrylate syrup is one obtained by mixing about 100 parts by weight of viscous methyl methacrylate syrup with from about 0.5 to about 15 parts by weight of a radical polymerizable cross-linking monomer having α, β-unsaturated groups to obtain a resin solution;

2. The particle size of the aggregates is between 0.6 and 15mm diameter;

3. The thickness of the layer of the aggregates and the thermosetting acryl resin is between about 10 and 30mm;

4. The weight ratio of parts of water to parts of the cement in the hydraulic cement composition is about 50:60 to 40:50, respectively;

5. The thickness of the hydraulic cement composition is about 40 to 100mm.

8 Claims, No Drawings

PROCESS FOR PRODUCING AN ARCHITECTURAL PRECAST CONCRETE PANEL

CROSS REFERENCE TO RELATED APPLICATIONS

This application is a continuation-in-part of copending application Ser. No. 592,938 filed July 3, 1975, now abandoned, which is in turn a continuation of application Ser. No. 455,504 filed Mar. 27, 1974, now abandoned.

BACKGROUND OF THE INVENTION

1. Summary of the Invention

Nowadays, especially in Europe and America, as the tendency of producing materials in factories is progressing, the materials which need much labor on the site are regarded as not up to date. In this respect, an architectural precast concrete panel, which plays an important role in architectural designs, has attracted public attention, and reconsideration has arisen to make these panels individual design materials. For a period of time after the 2nd World War, it was said that the surface of concrete itself was beautiful. However, in the future, the application of precast architectural materials will become important. For the development of said architectural materials, there are many problems to be studied, and the technical development is very significant. Especially, with increase of precast concrete building, research for manufacturing technique and construction method has progressed. Further, referring to the finishing procedure for the surface, which is in the scope of the technique of the plasterer, technical progress has decreased the defects in the standardization of surface finishing, and the improvement in mass effect, the variety of material and the quality thereof is remarkable.

2. The Prior Art

However, the usual procedures for finishing of the surface of the precast concrete panel are (a) finishing without any treatment, (b) finishing by exposing aggregates on the surface, (c) finishing with tiling, (d) finishing with adhesion treatment, (e) paint finishing, and (f) finishing of surface treatment by chemical agents and the treatment of surface by carbon dioxide gas. These finishings are carried out usually by employing a secondary procedure, for example by painting, washing with acids, and using surface retarders on the surface, before the hardening of a concrete panel. Therefore, these procedures would not be productive, and for the use of a long period, repairs and inspections are necessary at least once every several years. Considering in general the above matters, there are many problems for the productivity, economical factors and qualities.

More recently, efforts have been made to improve the previous methods, or to develop a novel method, of decorating walls, floors and ceilings of a construction. On this line, processes for producing a novel precast concrete panel having a decorative surface layer from a synthetic resinous binder and aggregates have been developed, some of which can be seen, for example, in the specifications of U.S. Pat. Nos. 3,097,080; 3,439,076; 3,574,801 and 3,632,725.

However, in the processes disclosed in the specifications of the above-identified U.S. Patents, the decorative layers are composed from unsaturated polyester or epoxy resins used as binders for the aggregates. Since these resins are essentially weak in resistance against weathering, they are not suited to materials for construction on account of lack of long enduring stability. Further, those panels which are produced in the disclosed processes are not provided with properties suited to wall, floor or ceiling material themselves. They are intended to be used as applied to the surface of constructions, and are hardly useful materials from the point of view of economy and workability.

Therefore, for production of cheaper, more durable and superior architectural precast concrete panels, the inventors have found that the following conditions are critical and necessary:

1. The process of making the panels should include simultaneous formation of a decorative surface and a concrete layer without any secondary procedure.
2. The physical properties of said concrete panel should not be influenced badly by the simultaneous formation into one body.
3. The durability of said concrete panel should be superior for chemical and physical changes.
4. Repairs should not be necessary for a long period,
5. The decorative surface should be free from efflorescence.

We have investigated how to produce architectural precast concrete panels which meet the above critical conditions and requirements. Firstly, use of an epoxy or an unsaturated polyester resin as a binder was found unsuited to produce a colorless transparent and weather-resistant surface that could be exposed to the weather for a long period without losing stability against weathering. In the next place, use of methyl methacrylate polymer known as organic glass as being colorless, transparent and highly weather resistant was studied. This polymer is described in Cement and Concrete Research, Vol. 1, No. 1, pages 187–210 (1971) where it is stated that when the monomer of methyl methacrylate and a polymerization initiator are mixed with a hydraulic cement composition and the hydration and polymerization reactions are brought to completion, the methyl methacrylate monomer interferes with the hydration reaction of cement and causes deterioration of the physical properties of the concrete or mortar products.

However, we have succeeded in producing a sufficiently strong adhesive power between the decorative layer, consisting of methyl methacrylate resin and supporting material, and the lining concrete layer only by using partly polymerized methyl methacrylate monomer in syrup in combination with the radical-polymerizing cross-linking monomer. In addition, the transparency of the methyl methacrylate resin permits the three-dimensional appearance of the supporting material to be fully realized. The product satisfies all the above listed critical requirements of precast concrete panels. Thus, we have accomplished the present invention.

BRIEF DESCRIPTION OF THE INVENTION

This invention relates to a process for producing an architectural precast concrete panel which comprises, molding a mixture of methacrylic syrup containing cross-linking monomer and aggregates in a predetermined mold, and during the nonpolymerized state of the above mixture, placing a hydraulic cement composition on the surface of said mixture in the mold to form one body together by the polymerization of the above mixture and the hydration of the cement composition at the same time. A particularly preferred process employs the following critical conditions:

1. The viscous methyl methacrylate syrup is one obtained by mixing about 100 parts by weight of viscous methyl methacrylate syrup with from about 0.5 to about 15 parts by weight of a radical polymerizable cross-linking monomer having α, β-unsaturated groups to obtain a resin solution;

2. The particle size of the aggregates is between 0.6 and 15 mm diameter;

3. The thickness of the layer of the aggregates and the thermosetting acryl resin is between about 10 and 30 mm;

4. The weight ratio of parts of water to parts of the cement in the hydraulic cement composition is about 50:60 to 40:50, respectively;

5. The thickness of the hydraulic cement composition is about 40 to 100 mm.

OBJECTS OF THE INVENTION

An object of the present invention is to provide an architectural precast concrete panel which has superior chemical and physical properties for weathering resistance, luster, hardness of surface, solvent resistance, water-proof and dirt-resistant. It is also an object of the invention to provide a process for making such a panel.

DETAILED DESCRIPTION OF THE PREFERRED EMBODIMENT

The process of this invention will be explained in the progress of the work described as follows.

Methylmethacrylate monomer is charged into a reaction vessel or an autoclave with a cooler, a stirrer, a thermometer and an inlet pipe for inert gas.

For the charged amount of methylmethacrylate, 0.001 – 0.015 weight percent of azobisisobutylonitril is added, and then polymerized 70° – 130° C. After the methylmethacrylate syrup in the reaction vessel has a viscosity of 1 – 30 centi-poise, it is cooled to 10° – 20° C immediately.

Thus, this syrup having a viscosity of 2 – 50 centi-poise at 25° C is produced.

Alternatively, a powdered methylmethacrylate polymer may be produced by mixing about 100 parts by weight of viscous methyl methacrylate syrup with from about 0.5 to about 15 parts by weight of a radical polymerizable cross-linking monomer having α, β-unsaturated groups to obtain a resin solution. Preservation of the methylmethacrylate syrup produced by the above two procedures becomes possible by adding a very small amount of a polymerization-inhibitor and a chain transfer agent.

For 100 parts by weight of the thus obtained methylmethacrylate syrup 0.5 – 15 parts by weight, preferably 3 – 7 parts by weight, of any kind of cross-linking monomer is added.

In case the amount of the cross-linking monomer is under 0.5 parts by weight, the adhesion strength between the resin layer and that of the cement composition decreases, while in the case of over 15 parts by weight of the above monomer, the adhesion strength increases, but the bending strength may decrease. The viscosity of the syrup obtained at this step is between 2 – 40 centi-poise (the mixture of methylmethacrylate syrup, or mixture of methylmethacrylate monomer and polymer and any kind of cross-linking monomers is referred to as a syrup).

Cross-linking monomers described in this invention are:

1. ethyleneglycol dimethacrylate;

2. the class of polyethyleneglycol diacrylates or a class of dimethacrylate having a general formula:

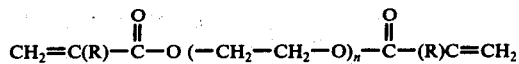

wherein R is H or CH$_3$, and $n$ has a value of 1 to 9;

3. the class of diallylesters of dibasic acids having the general formula:

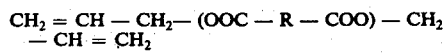

wherein the (OOC—R—COO) moiety is, for example derived from maleic acid, itaconic acid and phthalic acid;

4. the class of divinyl compounds having the general formula:

$$CH_2 = CH - (R) - CH = CH_2$$

wherein R is, for example

 ;

5. the class of allylesters of acrylic acid and methacrylic acid, for example, allylacrylate and allylmethacrylate;

6. the class glycidylesters of acrylic acid or methacrylic acid, for example, glicidylacrylate and glicydlmethacrylate;

7. a mixture of a glycidylester of acrylic acid or methacrylic acid and a hydroxyalkylester of acrylic acid and methacrylic acid, for example, glicydlmethacrylate and α-hydroxyethylacrylate, glicidylacrylate and α-hydroxyethylacrylate, and glicidylacrylate and hydroxypropylacrylate;

8. a mixture of a glicidyl ester of acrylic acid and methacrylic acid, and an α, β-unsaturated alkyl mono- and dicarboxylic acid or anhydride thereof, for example, glicidylmethacrylate and acrylic acid, methacrylic acid, itaconic acid or anhydride thereof, and maleic acid, or anhydride thereof.

The above classes are radical polymerizable and cross-linking monomers.

To 100 parts by weight of a syrup obtained by adding a cross-linking monomer described above, 0.01 – 1.0 parts by weight of a redox-polymerization initiator, for example the mixture of benzoylperoxide and dimethylaniline, is added and throughly mixed with stirring.

When the amount of the redox-polymerization initiator is less than 0.01 parts by weight, the polymerization of the syrup is very susceptible to the influence of the atmospheric temperature and at temperatures below 15° C the polymerization is incomplete. On the other hand, when the amount of the initiator is greater than 1.0 parts by weight, the polymerization is completed in too short a time, so that handling is difficult and severe efflorescence occurs in outdoor uses. Therefore, it has been discovered that the range of 0.01 to 1.0 parts by weight of the initiator is critical, and in view of handling and physical properties, 0.1 – 0.5 parts by weight of initiator is preferable.

By the 100% polymerization of the syrup thus obtained, a resin is produced which has good chemical and physical properties, namely, good weathering resistance, transparency, three dimensional structure, and the resultant resin is non-fusable and non-dissolving, and characterized by acryl resin.

These properties impart satisfactory physical and chemical properties to an architectural precast concrete panel.

As an aggregate which has the necessary shape for attaining the object of being an architectural precast concrete panel, many kinds of aggregates, for example, grains or small pieces and particles of river sand, marble, granite, sorpentine, artificial stone and pieces of glass and resin are used.

There is no specific limitation on the shape of these aggregates, but there is a critical size for the aggregates which must have a diameter of from about 0.6 to 15 mm. When aggregates of larger than 0.6 mm diameter are mixed, uniform flow of the mixture into the mold can not be assured, so that a satisfactory surface condition of the product can not be obtained. On the other hand, when aggregates of larger than 15 mm diameter are added, no substantial improvement of the descriptive property of the surface is experienced.

The aforesaid syrup, prepared as described above, is added to one or more kinds of aggregates, in the necessary amounts to wet the surfaces of the aggregates with complete mixing. This mixture is placed into a mold which has been previously prepared until a desired thickness (e.g. 8 to 30 mm) is reached.

It is important that the syrup used has good viscosity for workability in the molding and does not leave air bubbles between aggregates.

After molding, a hydraulic cement composition is placed on the resin layer in the mold. When the ratio of water to cement in the hydraulic cement composition is outside the range of 40 to 50%, the adhesion strength between the decorative surface and the lined concrete layer lowers to less than about 10 kg and can not assure safe use of the product for outside walls. For best adhesion strength, it is desirable to adjust the water to cement ratio between 43 and 47% by weight. Afterwards, a precast concrete panel is formed by the usual procedure, and thus an architectural concrete panel is produced.

In the test for the product of this invention using "Autograph IS-5000" made by Shimazu Factory Co. (the speed of pulling: 1 mm/min.) the tensile strength of the above product was 25 – 30 kg/cm$^2$ without breakage at the boundary surface, and breakage was found in the concrete layer. While, if other cross-linking resins were used, breakage was found on the boundary surface of the layer of resin and that of concrete, and the tensile strength was 2 to 4 kg/cm$^2$ if a thermoplastic acrylic resin was used, and 2 to 7 kg/cm$^2$ if an epoxyd acrylic resin, epoxyd resin and unsaturated polyester resin were used.

This surprising result is considered to be based on the fact that the monomer of the acrylate (non-polymerized) and the cross-linking monomer permeate the layer of the nonsetting cement composition, and the cross-linking polymerization is carried out at the surroundings of the inorganic particles, for example, the sand and gravel particles in the boundary layer thereof, and in the layer of the cement composition, the hydration of the cement proceeds in the water containing partially dissolved monomer, and the boundary layer of the resin and the cement composition is formed as a mixed layer of monomer, water and aggregates, and by water, polymerization of the monomer and hydration of the cement proceeds, with the result that an architectural precast concrete having a strong adhesive power is produced as one body.

As for molding besides the above procedure, a layer of the desired amount of syrup is previously placed in the mold, and aggregates are buried into the syrup so as to make a desired surface, and a hydraulic cement composition is placed on the above layer.

Alternatively, the process may be carried out so that a layer of aggregates is made first in the mold, and then this layer is filled up with a syrup, and finally a cement composition is placed on the layer.

If the former procedure is used, the viscosity of the syrup is preferably about 20 to 40 centi-poise, and in the latter procedure it is about 2 to 15 centi-poise. By the above procedures, a designed surface can be really made on the surface of the concrete board.

Further, it is surprising that the surface of boundary between the acrylic resin and the cement composition has a strong adhesive power which is hitherto unknown so that it appears as if there is no boundary surface, although different substances make the boundary.

The process of this invention is explained in the following examples.

EXAMPLE 1

In a four-mouthed flask with a stirrer, a thermometer, a reflex cooler and an inlet pipe for nitrogen gas, was placed 600 gr. of methyl methacrylate monomer and 0.006 g of azobisisobutylonitril. The air in the flask is thoroughly flushed out and replaced by introducing nitrogen gas therein, continuing this introduction until the polymerization reaction of the monomer finishes.

After keeping the reaction system at 80° ± 1° C for 180 minutes, the contents of the flask comprising a syrup was cooled to a temperature of 25° C by cool water of 10° C. Then this syrup had the viscosity of 15.4 centi-poise.

To 100 parts by weight of this syrup, 5 parts by weight of triethylglycol dimethacrylate, 0.2 parts by weight of benzoyl peroxide and 0.09 parts by weight of dimethylaniline were added. The rssultant mixture, thus prepared, is referred to as syrup A. Subsequently, 400 parts by weight of pieces of marble with dimension of 8 to 10 mm were mixed with 90 parts by weight of syrup A so that the said pieces of marble were all wetted with syrup A. This mixture was molded into a mold with dimensions of 100 cm in width, 200 cm in length and 10 cm in height.

In this case the aggregates and the syrup A were added to the mold so as to obtain a decorative layer of about 15 mm thickness.

Then, previously mixed concrete materials having the composition 1 : 2 : 0.5 of cement: standard sand (JIS-5201) : water were placed on the mixture of syrup A and marble. After finishing the addition of the concrete material, the mold was cured in the atmosphere at 20° ± 3° C for 24 hours, and then the contents of the mold were removed from the mold.

The architectural precast concrete panels thus prepared had a thickness of 10 cm and a tensile strength of 13.1 kg/cm$^2$ after 1 week, 18.8 kg/cm$^2$ after 2 weeks and 22.1 to 25.3 kg/cm$^2$ after a month.

It was found that the increase of the tensile strength depends on the increase of age. In any case, breakage on the boundary surface between the layer of resin and concrete was not found, and breakage arose in the layer of the concrete.

As a result of an accelerated weathering test for 500 hours and 1000 hours, no change of physical properties of the resin layer could be found except a slight color change.

EXAMPLE 2

To 100 parts by weight of methyl methacrylate syrup prepared as described in Example 1 were added 5 parts by weight of a mixture having equal mols of glycidylmethacrylate and methacrylic acid, 0.3 parts by weight of benzoyl peroxide and 0.2 parts by weight of dimethyl aniline (this mixture is referred to as syrup B). Then, 400 parts by weight of washed river sand with dimensions of less than 3 mm and the syrup B were mixed thoroughly.

By the same procedure as described in Example 1, an architectural precast concrete panel was produced. After one month, this board had a tensile strength of 28.8 to 30.2 kg/cm$^2$.

In this case, the aggregates and the syrup B were mixed in the ratio of 800 : 200 and the decorative layer was about 8 mm thick. The concrete layer for lining was approximately 72 mm thick and therefore the total thickness was 8 cm.

EXAMPLE 3

70 parts by weight of methyl methacrylate monomer were added with 30 parts by weight of polymethyl methacrylate (mean polymerization degree of 4000) prepared by a suspension polymerization. The resultant mixture was dissolved by heating at 80° C for 30 minutes, and then cooled at 25° C. This mixture had a viscosity of 35 centi-poise.

To 100 parts by weight of the resulting mixture, 8 parts by weight of a mixture having equal mols of β-hydroxypropyl methacrylate and glycidyl acrylate, 0.1 parts by weight of benzoyl peroxide and 0.01 parts by weight of dimethylaniline were added (this mixture is referred to as syrup C).

The syrup C was placed in a mold described in Example 1 in thickness of 3 mm. Into the layer of syrup C, pieces of brick with the dimension of 2 to 3 mm and pieces of marble with the dimension of 8 to 10 mm were buried.

Then, a concrete mixture having the composition cement : sand : gravel of 1 : 2 : 3 (water cement ratio was 45% by weight) was placed in a mold and cured in steam. After curing, the molded panel was removed from the mold. The tensile strength of the molded panel after one month was 25 to 30 kg/cm$^2$.

Thus, the pieces of marble together with the pieces of brick which filled up the gaps of the former created a novel decorative surface having three-dimensional appearance.

EXAMPLE 4

A clean dried river sand with a dimension of less than 1 mm and pieces of color-glass with a diameter of 2 to 5 mm were filled up to form a layer of a thickness of 5 to 7 mm in the mold described in Example 1.

On the other hand, into the apparatus described in Example 1, 600 g of methyl methacrylate and 0.009 g of azobisisobutylonitril were placed and heated up to 90° C, keeping it at 90° C for 15 minutes. After the reaction, the resultant syrup was cooled. The viscosity of this syrup was 3.3 centi-poise at 25° C.

100 parts by weight of this syrup were mixed with 5 parts by weight of diallyl phthalate, 0.5 parts by weight of benzoylperoxide, and 0.2 parts by weight of dimethylaniline.

After this mixture was homogenized, it was poured in a mold to fill up the layer of the prepared aggregates completely. The bubbles of gas were completely removed after the end of the pouring, and the mold was allowed to stand for one hour. Subsequently, the same concrete used in Example 3 was placed in the mold, and the molded panel was removed from the mold. The tensile strength of the molded panel was 23 to 27 kg/cm$^2$ after one month.

EXAMPLE 5

Instead of 5 parts by weight of triethylene glycol dimethacrylate used in Example 1, 2 parts by weight of ethyleneglycol dimethylacrylate were used.

The architectural precast concrete panel produced by the procedure used in Example 1 had a tensile strength of 22 to 25 kg/cm$^2$.

EXAMPLE 6

100 parts by weight of methyl methacrylate syrup prepared as in Example 1 were mixed with 10 parts by weight of allyl acrylate and 0.2 parts by weight of benzoyl peroxide, 0.05 parts by weight of dimethyl aniline. Using the thus prepared syrup, the same procedure as described in Example 2 was carried out. The thus produced panel had a tensile strength of 23 to 25 kg/cm$^2$.

EXAMPLE 7

Instead of 8 parts by weight of a mixture having equal mols of β-hydroxypropyl methacrylate and glycidylacrylate described in Example 3, 13 parts by weight of divinyl benzene were used.

The concrete panel produced by the procedure described in Example 3 had a tensile strength of 25 to 27 kg/cm$^2$.

EXAMPLE 8

Instead of 5 parts by weight of diallyl phthalate, 4 parts by weight of glycidylacrylate were used, and the same procedure as described in Example 4 was employed.

The thus produced decorative precast concrete panel had a tensile strength of 21 to 25 kg/cm$^2$ after one month.

COMPARATIVE EXAMPLE 9

In place of the syrup A used in Example 1, 90 parts by weight of epoxy solution consisting of 100 parts by weight of Epikote 828 (Shell Chemical) and 10 parts by weight of hardener HY 951 (Ciba-Geigy) was used. This was mixed with 400 parts of marble in pieces and the process was the same as in Example 1, to prepare architectural panels.

The adhesive strength achieved was only 5 to 7 kg/cm$^2$ in a full month. This value was so poor that, if the panel were applied to an outside wall, there would exist some safety problems. The resin layer on the decorative surface remained transparent but turned yellow, and this produced only insufficient effects of expressing wet colors as well as the three-dimensional appearance of the aggregates. In an accelerated exposure test for 500 hours the resin turned markedly yellow and, therefore, proved not to be suited to use for outside wall application.

COMPARATIVE EXAMPLE 10

Instead of syrup A used in Example 1, a solution of methyl methacrylate denatured unsaturated polyester resin was used which consisted of 100 parts by weight of Polylight TC-241 (Japan Reichhold Chemicals, Inc.), 1 part by weight of methyl ethyl ketone peroxide and 0.1 part by weight of 6% cobalt naphthenate, and 90 parts by weight of the said resin solution was mixed with 400 parts of marble pieces. The same procedure as in Example 1 was followed to prepare architectural concrete panels.

The adhesive strength achieved in a month was only 2 to 7 kg/cm$^2$ which was too poor a value to permit employment of the panels without apprehension.

On account of being denatured, methyl methacrylate the decorative layer, after molding, could be made almost satisfactorily transparent and to produce a three-dimensional appearance of aggregates. On the other hand, an accelerated exposure test for 500 hours produced hair-cracks on the surface and a color change to yellow, which resulted in a failure of maintaining a durable good appearance.

WHAT IS CLAIMED IS:

1. A process for producing a decorative precast concrete panel for an outside wall, which comprises mixing about 100 parts by weight of viscous methyl methacrylate syrup with from about 0.5 to about 15 parts by weight of a radical polymerizable cross-linking monomer having $\alpha, \beta$-unsaturated groups to obtain a thermosetting acrylic resin solution, mixing about 100 parts by weight of said resin solution with from about 0.01 to about 1.0 part by weight of a redox type polymerization initiator and from about 300 to about 700 parts by weight of aggregates to form a mixture, molding the said mixture into a shape, then placing a hydraulic cement composition on the surface of the said mixture while the said mixture is in a nonpolymerized state, performing simultaneously the polymerization of said resin and hydration of said hydraulic cement composition, whereby said mixture is formed into molded substances in one body as a concrete panel for outside walls resistant to weathering.

2. Process according to claim 1, in which the said resin solution has a viscosity of from about 2 to about 40 poise at 25° C, and the said viscous methyl mathacrylate syrup has a viscosity of from about 2 to about 50 poise at 25° C.

3. Process according to claim 1, wherein the said radical-polymerizable cross-linking monomer comprises at least one monomer selected from the group consisting of mono- and polyethyleneglycol dimethacrylates, diallylesters of dibasic acids, divinyl compounds, allyl esters of acrylic or methacrylic acid, glycidyl esters of acrylic or mathacrylic acid, mixtures of glycidyl esters or acrylic or methacrylic acid with hydroxyesters of acrylic or methacrylic acid, and mixtures of glycidyl esters of acrylic and methacrylic acid with $\alpha, \beta$-unsaturated alkyl mono and dicarboxylic acids and with $\alpha, \beta$-unsaturated alkyl acid anhydrides.

4. Process according to claim 1, wherein the aggregate has pieces or particles with a diameter of 0.6 to 15 mm.

5. Process according to claim 1, wherein the layer consisting of the aggregates and the thermosetting acrylic resin is about 8 to 30 mm thick.

6. Process according to claim 1, wherein the water cement ratio in the hydraulic cement composition is about 40 to 50% by weight.

7. Process according to claim 1, wherein the lining layer of the hydraulic cement composition is selected to range about 40 to 100 mm thick, the thickness of said layer being selected depending on the strength required for precast concrete panels for use as a material for outside walls.

8. A decorative precast concrete panel for an outside wall produced by the process defined in claim 1.

* * * * *